Patented Sept. 23, 1952

2,611,773

UNITED STATES PATENT OFFICE 2,611,773

ESTRADIOL 17-CYCLOPENTANEPROPIONATE

Arnold C. Ott, Kalamazoo, Mich., assignor to The Upjohn Company, Kalamazoo, Mich., a corporation of Michigan No Drawing. Application August 21, 1951, Serial No. 242,990

1 Claim. (Cl. 260—397.5)

This invention relates to new compositions of matter, particularly to estradiol 17($\beta$)-cyclopentanepropionate and to compositions containing this ester.

Estradiol 17($\beta$)-cyclopentanepropionate can be prepared conveniently from estradiol-17($\beta$) by a two step conversion. Estradiol-17($\beta$) is first converted to estradiol 3,17($\beta$)-dicyclopentanepropionate by the action of cyclopentanepropionyl chloride or cyclopentanepropionyl bromide in the presence of a tertiary base such as pyridine or dimethylaniline, and the intermediate diester is subjected to hydrolysis which selectively hydrolyzes the acyl group at the 3 position to yield estradiol 17($\beta$)-cyclopentanepropionate. The selective hydrolysis is conveniently accomplished by the action of potassium carbonate in aqueous methanol at about twenty degrees centigrade.

The ester can also be prepared by methods known to the art for the acylation of secondary alcoholic hydroxyl groups.

Estradiol 17($\beta$)-cyclopentanepropionate is a potent injectable estrogen of long duration of action. Experiments on the maintenance of estrus in sprayed rats show that it has a more prolonged action than any other estrogen being marketed at the present time.

Therapeutic oil solutions of estradiol 17($\beta$)-cyclopentanepropionate can be prepared by dissolving the ester with stirring and gentle warming in a nontoxic glyceride oil suitable for parenteral administration such as peanut, cottonseed, corn or sesame oil. The concentration of the ester in the oil is limited only by its solubility, and stable solutions containing about 400 milligrams of estradiol 17($\beta$)-cyclopentanepropionate per milliliter of oil have been prepared. Oil solutions can also be prepared by dissolving the ester in ether or other similar low-boiling nonreactive solvent, mixing the solution with the selected oil and removing the ether under reduced pressure.

For some purposes it is desirable to add aluminum monostearate to the oil solution to obtain a thixotropic gel. Such a gel can be prepared by adding about two percent by weight of aluminum monostearate per volume of oil to an oil solution of the ester at room temperature, heating the solution to about 120 degrees centigrade for about ten minutes and cooling.

For other purposes it is desirable to employ an aqueous suspension of the estradiol 17($\beta$)-cyclopentanepropionate. Such a suspension is prepared by making a solution of about 0.01 percent of a quaternary ammonium salt and about 0.9 percent of sodium chloride in water for injection (USP), sterilizing the solution of filtration, gradually mixing this solution with the desired amount of estradiol 17($\beta$)-cyclopentanepropionate, diluting to volume, passing through a sterile homogenizer and filling into sterile vials.

The following examples will illustrate a method for the preparation of the products of this invention, but the said invention is not to be considered as limited thereto.

*Example 1.—Estradiol 3,17($\beta$)-dicyclopentanepropionate*

A solution of 80.0 grams (0.294 mole) of estradiol-17($\beta$) in 860 milliliters of pyridine was cooled in an ice-bath and 130.0 grams (0.81 mole) of cyclopentanepropionyl chloride was added dropwise with stirring during a period of about twenty minutes. The ice-bath was removed, stirring was continued for one hour and the reaction mixture was allowed to stand at room temperature overnight. The mixture was warmed on a steam bath and stirred for about 45 minutes, cooled and poured slowly onto about 1000 grams of ice to which had been added 330 milliliters of concentrated sulfuric acid. The precipitated product was extracted with 400–500 milliliters of ether, and the extract was washed successively with two 100-milliliter portions of cold 1 N sulfuric acid, two 100-milliliter portions of saturated sodium carbonate solution and water until the pH was 7 and dried over anhydrous sodium sulfate. After removal of the drying agent, the solution was concentrated to a volume of about 250 milliliters and an equal volume of methanol was added. After chilling overnight a total of 120.0 grams (78.5 percent) of estradiol 3,17($\beta$)-dicyclopentanepropionate was obtained which melted at 87–90 degrees centigrade. A sample recrystallized from ether-methanol for analysis melted at 90.5–91.5 degrees centigrade; $[\alpha]_D^{26} = +27.6$ degrees (chloroform).

Anal. calcd. for $C_{34}H_{48}O_2$: C, 78.42; H, 9.19; Found: C, 78.35; H, 9.24.

*Example 2.—Estradiol 17 ($\beta$)-cyclopentanepropionate*

To a solution of 2.5 grams (18.1 millimoles) of potassium carbonate in 25 milliliters of water was added 225 milliliters of methanol followed by 5.0 grams (9.6 millimoles) of estradiol 3,17($\beta$)-dicyclopentanepropionate. The mixture was stirred for two and one-half hours at twenty degrees centigrade ± two degrees during which time some precipitation occurred. The mixture was poured into 700 milliliters of water with efficient stirring, and the precipitated solid was removed by filtration, washed with water and dried. Recrystallization of the crude product from eighty percent methanol gave 3.16 grams (83 percent) of estradiol 17(β)-cyclopentanepropionate melting at 148–151 degrees centigrade. Recrystallization from benzene-petroleum ether raised the melting point to 151–152 degrees centigrade; $[\alpha]_D^{25} = +45$ degrees (chloroform).

Anal. calcd. for $C_{26}H_{36}O_3$: C, 78.74; H, 9.15; Found: C, 78.94; H, 8.90.

Various modifications may be made in the present invention without departing from the spirit or scope thereof, and it is to be understood that I limit myself only as defined in the appended claim.

I claim:

Estradiol 17(β)-cyclopentanepropionate.

ARNOLD C. OTT.

No references cited.